July 30, 1940.   R. E. WAGNER   2,209,487
WATER SOFTENING APPARATUS
Filed Jan. 23, 1937
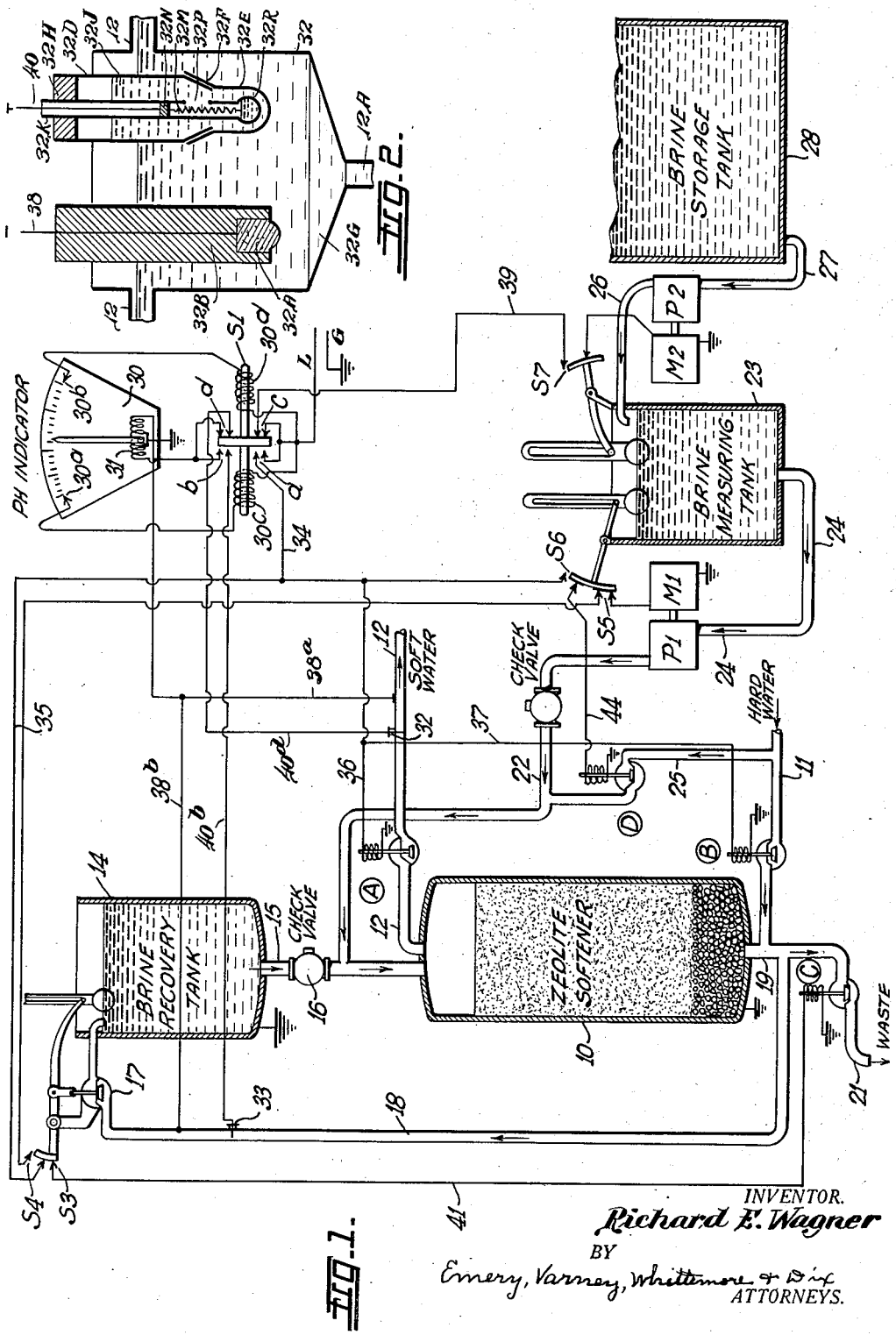
INVENTOR.
Richard E. Wagner
BY
Emery, Varney, Whittemore & Dix
ATTORNEYS.

Patented July 30, 1940

2,209,487

UNITED STATES PATENT OFFICE 2,209,487

WATER SOFTENING APPARATUS

Richard E. Wagner, Forest Hills, Long Island, N. Y.

Application January 23, 1937, Serial No. 121,971

12 Claims. (Cl. 210—24)

This invention relates to a method of and apparatus for softening water and has for an object the provision of improvements in this art.

The most common method for determining the hardness of water is by the soap test. Soap causes no cloudiness when a drop is put in soft water but does when put in hard water. This test is used to determine when a zeolite softener is exhausted and likewise when the zeolite has been regenerated.

In practice it is usual, after the character of a given supply of water has once been determined, to regenerate the zeolite after a predetermined quantity of water has passed therethrough. This may be done either manually or automatically. This method, it will be realized, is entirely empirical and does not furnish an accurate qualitative control of the softness of the water delivered.

I have found that there is sufficient change in the pH value of the water during the cycle of operation of a zeolite softener to permit the use of the pH of the water to determine when a zeolite softener is exhausted, when it is completely regenerated and also to give an indication of the softener at various stages of the cycle of operation. The pH value is defined as the logarithm of the reciprocal of the hydrogen-ion concentration, hence it is a measure of only the hydrogen-ion concentration of a solution. In contrast to this, electrical conductivity is a measure of the concentration of all ions in the solution, both positive and negative, and which in a water softener effluent such as that under consideration might include sodium ($Na^+$), potassium ($K^+$), lithium ($Li^+$), calcium ($Ca^+$), hydrogen ($H^+$), hydroxyl ($OH^-$), chlorine ($Cl^-$), normal carbonates ($CO_3^-$), etc.

Something of the theory of pH measurements and their distinction from conductivity measurements is given in the textbook of W. Mansfield Clark, DeLamar Professor of Physiological Chemistry at Johns Hopkins University "The Determination of Hydrogen Ions" 1928. A constant reading pH indicator can be used to give a continuous visible reading of the condition of the zeolite and can be used in place of the customary soap test to determine when a zeolite softener is exhausted and also when the regeneration is completed. A pH indicator can also be used to automatically control the operation of a zeolite water softener.

In general, the pH value of the effluent of a zeolite water softener when fully regenerated is higher than that of the untreated water. As the zeolite becomes exhausted the pH value of the treated water gradually falls. When the pH value of the treated water drops to approximately its lowest point of the complete cycle, say seven-tenths of a unit on the scale of a pH meter, the zeolite is considered to be exhausted. It then requires regeneration. Therefore, by testing the pH value of the effluent the point of exhaustion of the zeolite of the softener can readily be determined. There are available on the market pH indicators which are sensitive enough for the present purposes. Some of these indicators read directly in pH values. For example, an antimony-calomel electrode assembly and an automatic recorder and controller such as are shown on page 7 of the Leeds & Northrup Company Bulletin N 96S-744A-1937, may be used.

The antimony-calomel electrode assembly may comprise an antimony measuring electrode or half-cell, such as that described on page 13 of the Leeds & Northrup Company catalog EN-96-1937, and a calomel reference electrode or "half-cell" such as that described and shown on the left of the illustration on page 14 of this catalog. The calomel reference electrode is commonly used with any of several different types of measuring electrodes, such as the glass electrode (shown in the illustration on page 14), a hydrogen gas electrode, a quinhydrone electrode, etc., as described in the catalog. I have found that the antimony measuring electrode is suitable for the purposes of this invention and is desirable because it is simple and rugged. The relative positions of the reference (left on page 14 of catalog) and measuring (right) electrodes are shown in the central portion of the illustration on page 14 of the catalog. There they are placed in a sample beaker of test liquid, whereas for a continuous indicator they are placed in a flowing body of test fluid, the latter being the type of installation which has been converted and adapted to the purposes of the present invention.

By placing suitable contacts on the indicator and making connections with suitable controls, the pH indicator may be made to furnish automatic control of the softener in much the same manner as household heating furnaces are controlled from thermostats. Also by a reading of the indicator it can be determined when the softener is exhausted, when completely regenerated, and its condition at any given time.

In the same manner the completion of the removal of brine from the zeolite, i. e., the brine rinsing operation, can be indicated or controlled by the pH value of the effluent. At the start of the brining operation, and especially as the first brine appears in the effluent, the pH value of the effluent will be at approximately its lowest point. From this point it will gradually rise as the regeneration continues until at the end of the treatment the brine rinse effluent will have approximately the same pH value as the untreated water or rinse water being fed to the softener, or even higher, indicating completion of regeneration.

By suitable contacts on the pH indicator this high point can be employed to control the brine rinsing operation of the softener; just as the low point of exhaustion is used to start the regeneration.

In order to illustrate the principles of the invention one form of apparatus embodying the invention will now be described in connection with the accompanying drawing in which:

Fig. 1 is a schematic view of a water softener installation; and

Fig. 2 is a sectional view of a pH indicating electrode assembly, such as one of the two indicated diagrammatically in Fig. 1.

Referring to the drawing, the numeral 10 indicates a tank containing zeolite water softening material to which hard water to be softened is supplied by pipe 11 and from which softened water is delivered to pipe 12.

In order to stop the normal flow of water when the zeolite in the softener is to be regenerated, the delivery and supply pipes 12 and 11 are supplied with solenoid operated valves A and B respectively. The valves are normally open but are closed when electric current flows through the coils of the solenoids.

Recovered brine from the previous regeneration is fed from a brine recovery tank 14 through a pipe 15 provided with a check valve 16. As long as pressure is maintained against the lower side of the check valve 16 it cannot open to let the brine flow down but when the back pressure is relieved the valve is permitted to open and the brine to flow into the softener.

The liquid level in tank 14 may be controlled by a float controlled cut-off valve 17. This valve may be similar to common flush tank valves except that loose motion is provided between the float and the valve operating lever to accommodate for the large capacity of the tank. The valve lever also controls switches S3 and S4, the switch S3 being closed when the float is up and being opened when the float is down. The switch S4 is open when the float is up and closed when the float is down. The valve and related parts are so balanced that the valve and switches are only operated as desired at each end of the float travel. The tank 14 is filled by a supply pipe 18 leading to an outlet pipe 19 connected to the bottom of the softener tank 10.

The outlet pipe 19 connects with a waste pipe 21. The waste pipe is normally closed by a solenoid valve C but the valve is opened when electric current flows in its solenoid coil from the switch S3.

Means are provided for supplying fresh brine to the top of the softener. This comprises a pipe 22 connected to the pipe 15 below the check valve 16. A pump P1 driven by a motor M1 takes brine from a brine measuring tank 23 by way of a pipe 24 and forces it through the pipe 22. The motor M1 is controlled jointly by the switch S4 and a switch S5 controlled by a float in the brine measuring tank 23. The switch S5 is closed when the float is up and open when the float is down.

The float for switch S5 also controls another switch S6 of a solenoid valve D disposed in a hard water by-pass pipe 25 arranged between the hard water inlet pipe 11 and the brine inlet pipe 22. The valve D is normally closed but is opened when current flows in its solenoid coil from the switch S6.

Means are provided for replenishing the brine in the brine measuring tank 23, this means comprising a pump P2 actuated by a motor M2 and pipes 26 and 27 taking brine from a brine storage tank 28. A float controlled switch S7 controls the operation of the pump motor M2. The switch is closed when the float is down and opened when the float is in its top position.

The operation of the apparatus may be controlled in any desired manner, either manually by reference to a pH indicator 30 or automatically by the pH indicator. The needle position of this indicator is controlled by a coil 31 responsive selectively to the pH potential at an electrode assembly 32 in the soft water line 12 and an electrode assembly 33 in the brine supply line 18. The electrode assemblies 32 and 33 are not the common type used to measure electrolytic conductivity but are the special type of electrodes suitable for determining pH values. There is no direct relationship between pH and conductivity. In zeolite water softening operations there is merely an exchange of a "soft" salt for a "hard" salt with little or no change in conductivity; but there is considerable change in pH values which apparently has not heretofore been realized and usefully applied. The discovery of this fact and the practical application of pH control to water softening operations without discoloring or otherwise destroying the usefulness of the softened water are features which appear to be new in the present invention.

One of the electrode assemblies which is indicated generally at 32 or 33 is shown more in detail in Fig. 2. Here the pipe 12 is shown entering and leaving the electrode assembly 32. In practice it may be preferable to bleed off a small quantity of the test fluid or effluent (the softened water or brine effluent to be measured) and the numeral 12A may denote this pipe. The test fluid may be fed back to the main body of fluid without injury because no discoloring or harmful substance has been added; but inasmuch as the amount bled off will be negligible it may simply be discarded after passing the electrode assembly. If the bleeder pipe 12A is used, one of the pipes 12 in Fig. 2 may be discarded, the other being adequate for discharge from the electrode assembly casing.

The electrode assembly 32 comprises the antimony measuring electrode or half-cell 32A, having its tip exposed beyond the end of a hard rubber filler or holder 32B. The calomel reference electrode or half-cell comprises an outer glass tube 32D and a glass cup 32E which slips down into the tube until it brings up against a ground glass joint 32F. The tube and cup are filled to a level higher than the level of the test fluid 32G outside with a suitable fluid 32J such as a saturated potassium chloride (KCl) solution. Held within the tube 32D by a stopper 32H is an inner glass tube 32K carrying a brass conductor 40 connected to a platinum electrode 32M. A glass seal 32N is provided within the tube 32K. The tube 32K has an opening 32P on the side below the seal 32N to permit the solution (KCl) to enter. In the bulbous bottom of the tube 32K there is placed a body of material 32R consisting of mercury (Hg) with a suspension or emulsion of calomel or mercurous chloride (Hg₂Cl₂). The material 32R contacts with the platinum electrode 32M and the solution 32J contacts with both. The solution also seeps through the ground glass joint 32F of the outer tube to keep the joint moist, though without appreciable leakage, and forms an electrical circuit or bridge from the calomel-mercury emulsion to the test fluid.

It is understood that electrolysis is the basis of action of pH indicators but applicant makes no claim to the theory of action of pH indicators. One type has been illustrated but it is to be understood that there may be many other types.

The pH indicator is provided with adjustable contacts 30a and 30b, the first being for low pH value and the second for high pH value. These contacts 30a and 30b, in conjunction with the needle of the pH indicator, control a master switch or relay S1, the switch being moved and held in either of two opposite directions after actuation by one or the other of the solenoid coils 30c and 30d associated with the contacts 30a and 30b respectively.

The switch blade of switch S1 controls four sets of contacts, two sets on each side. One set, a, supplies current from the line L to the branches 34, 35, 36, 37 serving the switch S3 and the solenoid valves A and B. Another set, b, on the same side through conductors 38b and 40b supplies current from the electrode assembly 33 to the coil 31 of the pH indicator. On the other side of the switch one set of contacts, c, supplies current from the line L through the wire 39 to the switch S7 controlling the motor M2. The other set on the same side, d, through the conductors 38a and 40d supplies current from the electrode assembly 32 in the soft water pipe to the coil 31 of the pH indicator. The conductors 38 and 40 of the electrode assembly shown in Fig. 2 connect with the conductors 38a or 38b and 40d or 40b for the electrode assemblies 32 or 33 respectively of Fig. 1.

Switch S3 is connected with the solenoid coils of valve C by wire 41.

Switch S6 is connected to the solenoid coil of valve D by the wire 44.

While the contacts of the pH indicator are shown as being directly connected in the main power line for operating switch S1 it will be understood that suitable relays or other devices may be interposed if necessary or desirable in the usual manner of building up power for operating devices. The same applies to the valves and other operating parts, the present disclosure not being intended to show every detail of a commercial installation but merely enough to enable one skilled in the art to successfully use the invention.

The operation of the apparatus described may be as follows:

When the zeolite in the softener is exhausted the pH value of the effluent reaches its lowest point and the needle of the pH indicator makes contact with the terminal 30a. This causes energization of the coil 30c of the switch S1 to move the switch to the left to start automatic regeneration of the softener.

In more detail, the operation begins with the closing of the pair of contacts a and b connected by wires or conductors 34, 35, 36 and 37 with switch S3 of the brine recovery tank and the solenoid coils of valves A and B in the soft water line 12 and the hard water supply line 11 respectively. Valves A and B are closed to cause discontinuance of the softening operation. At the same time contact is made through switch S3, the float being in uppermost position, to the solenoid coil of the waste valve C to open the valve.

The contents of the brine recovery tank 14 are permitted, by reason of the release of back pressure on the check valve 16, to flow through the pipe 15 into the softener and out the waste pipe 21. The contents of the brine recovery tank include the new brine from the previous brining operation, the water required to rinse out the brine, and the water required to complete the filling of the tank.

When the level in the brine recovery tank drops to a given level the float causes the switch S3 to be opened. This de-energizes the solenoid coil of waste valve C and closes the waste pipe. It also closes the switch S4. Since the other switch S5 for the motor M1 is closed, the float in the brine measuring tank being in its uppermost position, the motor M1 and its pump P1 are started into operation to pump brine from the brine measuring tank 23 through pipes 24, 22 and 15 into the top of the zeolite softener tank 10. The brine flows down through the softener and out the pipes 19 and 18 (the valve C to the waste pipe being closed) and up into the brine recovery tank 14.

When the level in the brine measuring tank 23 reaches a predetermined lower level the float of switch S5 opens it contacts and stops the operation of the motor M1 and pump P1. At the same time it closes the contacts of switch S6 and applies current from the line L to the solenoid coil of the valve D in the hard water by-pass pipe 25 to permit water to flow from the hard water supply pipe 11 into the top of the softener to rinse out the brine. This is called the brine rinsing operation. The effluent of the brine rinse passes out the pipe 19 and flows through pipe 18 up into the brine recovery tank 14 with the brine which has just passed through.

When the brine rinse reaches its highest pH value it causes the pH indicator, through the electrode assembly 33 in the pipe 18, to be deflected to the right to engage the contact 30b. This causes energization of the solenoid coil 30d of the switch S1 to move the switch blade to the right. This de-energizes the solenoid coils of the valves A and B allowing the valves to open and at the same time deenergizes the solenoid coil of valve D allowing the valve to close. Hard water may now flow into the softener through the pipe 11 and may flow out as soft water through the pipe 12 or may flow up into the brine recovery tank through the pipe 18. It does the latter until the tank is full, when the float causes the valve 17 to close and shut off the flow. This also closes switch S3 to condition it for the next operation. It opens switch S4 so the pump P1 cannot be operated until the tank 14 is again emptied.

The blade of switch S1 also closes the power circuit from line L to the motor M2, the switch S7 having already been closed by the fall of its associated float in the brine measuring tank, starting the motor and the pump P2 into operation. The pump transfers brine from the brine storage tank 28 through the pipes 27, 26 into the brine measuring tank 23. When the latter is full a float opens the contacts of switch S7 and stops the operation of motor M2 and pump P2.

The rise of the other float in the brine measuring tank opens the contacts of switch S6. At the same time the contacts of switch S5 are closed, thus conditioning this switch for the next operation.

The softening apparatus has now been put back into normal operation and will so continue until the water delivered again drops to the low pH value as detected by the pH electrode assembly 32 required to re-cycle the apparatus.

It is to be noted that the contacts b and d for the electrode assemblies 32 and 33 are placed in such position relative to the blade of switch SI that each movement of the switch blade conditions one electrode assembly for control of the pH indicator and renders the other electrode assembly ineffective. However, the pH indicator as described up to this point, is at all times subject to the influence of current from one or the other of the electrode assemblies.

Instead of utilizing the higher pH value of the brine rinse to return the apparatus to normal operation, this may be accomplished by a float controlled switch associated with the brine recovery tank 14. The switch will be closed when the tank is full and opened when the tank is empty. The parts controlled by this switch may be exactly the same as those controlled through the high reading contact 30b. That is, the right coil 30d of switch SI will be energized when the float controlled switch is closed subsequently to the regenerating operation.

In some instances it may be desired to operate without the pH indicator being connected into the circuit. In this case the switch SI may be operated by hand and when once operated at the start or finish of the regeneration the rest of the cycle is automatically completed.

The term "zeolite" is used in this application in the same sense that it is used in the commercial field, to refer to base exchange materials generally. The term "regeneration" is also used in its common commercial sense to refer to regeneration of a zeolite by a regenerating base exchange medium. And while the base exchange medium mentioned herein by way of example is a brine of sodium chloride, because this is now most commonly used, it is to be understood that sodium chloride brine is not the only brine which may be used and also that brine is not the only regenerating medium which may be used, the medium used in any case being the one best adapted to serve the base exchange material employed for its intended purposes.

While one embodiment of the invention has been described in detail to furnish a concrete conception of the principles of the invention it will be understood that the invention may be variously embodied within the limits of the prior art and the scope of the subjoined claims.

I claim:

1. The method of controlling the operation of a zeolite water softener which comprises, determining the pH value of the effluent from the softener and controlling the cycle of operation of the softener in accordance with the pH value thus determined.

2. The method of controlling the operation of a zeolite water softener which comprises, continuously registering the pH value of the effluent from the softener on a pH indicator, and automatically controlling the cycle of operation of said softener by and in accordance with limiting values registered by said indicator.

3. The method of controlling the operation of a zeolite water softener which comprises, continuously registering the pH value of the effluent from the softener on a pH indicator, and controlling the cycle of operation of said softener by and in accordance with limiting values registered by said indicator.

4. The method of controlling the operation of a zeolite water softener which comprises, stopping the softening operation when the pH value of the effluent reaches a lower limit, regenerating the zeolite and subsequently restarting the softening operation in conformity with a control indication given after the completion of the regenerating operation.

5. The method of controlling the operation of a zeolite water softener which comprises, stopping the softening operation when the pH value of the soft water effluent reaches a lower limit, regenerating the zeolite with a brine solution, rinsing the brine from the zeolite, and restarting the softening operation when the pH value of the brine rinse reaches a higher limit.

6. The method of controlling the operation of a zeolite water softener which comprises automatically stopping the softening operation by and in accordance with a predetermined lower limit of pH value of the soft water effluent as registered on a pH indicator, regenerating the zeolite as an effect produced by said indicator, rinsing the brine from said zeolite as a controlled result of the brining operation, and restarting the softening operation automatically by and in accordance with a predetermined limit of the pH value of the brine rinse as registered on a pH indicator.

7. Apparatus for softening water, comprising in combination, a zeolite water softening device, means for supplying hard water to said device and withdrawing soft water effluent therefrom, and means responsive to the pH values of said effluent for controlling the operation of said apparatus.

8. Apparatus for softening water, comprising in combination, a zeolite water softening device, means for supplying hard water to said device and withdrawing soft water effluent therefrom, and means including a pH indicator and a connection therefrom to said soft water effluent for controlling the operation of said apparatus in accordance with the pH values of said soft water effluent.

9. Water softening apparatus comprising in combination, a zeolite water softening device, a pipe for supplying hard water to said device and a pipe for withdrawing soft water effluent from said device, solenoid controlled valves for said pipes, a brine recovery tank, means for supplying brine from said brine recovery tank to said softening device, a brine measuring tank, means including a motor and a pump for supplying brine from said brine measuring tank to said softening device and thence to said brine recovery tank, a brine storage tank, means including a second motor and pump for supplying brine from said storage tank to said measuring tank, a waste pipe from said softening device and a solenoid controlled valve for the waste pipe, a hard water by-pass pipe and a solenoid controlled valve for the by-pass pipe, a pH indicator, a pH electrode assembly in said soft water pipe for actuating said pH indicator in accordance with the pH values of the soft water, an adjustable limit contact on said pH indicator adapted to be contacted when the zeolite of the softener is exhausted as indicated by the electrode assembly in the soft water line, a master switch controlled by said pH indicator, said switch being actuated when the pH indicator registers exhaustion of the zeolite to close the valves in said soft water and hard water pipes and to open the valve in said waste pipe, the brine from said brine recovery tank thereupon flowing through said softening device to regenerate the zeolite therein, a float controlled switch and valve associated with said brine recovery tank, the closing of said switch by the drop of the float in the brine recovery tank closing the valve in said waste pipe and starting said first motor and pump to empty the brine from the brine measuring tank into said brine recovery tank, a float controlled switch associated with said brine measuring tank operative when the float drops to stop the operation of said first motor and pump, and a second float controlled switch operative when the float in the brine measuring tank drops for opening the valve in said hard water by-pass pipe to permit water to flow through the zeolite to remove excess brine therefrom and carry it to the brine recovery tank, means associated with the rinse effluent handling means of said device for reversing the position of said master switch after the zeolite has been regenerated and rinsed free of brine, the reversal of said master switch causing the valves in the soft water and hard water lines to be opened and the second motor and pump to be started to fill said brine measuring tank from said brine storage tank, and a second float controlled switch associated with said brine measuring tank for stopping the operation of said second motor and pump when the tank is full, the filling of said tank also causing the closing of the valve in the hard water by-pass pipe.

10. The method of controlling the operation of a zeolite water softener which comprises, continuously registering the pH value of an effluent from the softener on a pH indicator, and controlling a plurality of distinct phases of action of said softener by and in accordance with predetermined pH values registered by said indicator.

11. Apparatus for softening water comprising in combination, a zeolite water softening device including means for supplying hard water to said device and withdrawing soft water effluent therefrom and means for supplying a regenerating medium to said device and withdrawing the effluent therefrom during regeneration, and means including a constant-registering pH indicator provided with a plurality of selective contacts and associated means for controlling a plurality of operating phases of the softener automatically and in accordance with different pH values of the effluent from said softener.

12. The method of controlling the operation of a zeolite water softener which comprises, continuously registering the pH value of an effluent from the softener on a constant-registering pH indicator of the electrolytic type without requiring the addition of color indicating substances or other contamination to the water, and controlling a plurality of distinct phases of action of said softener automatically by and in accordance with predetermined pH values registered by said indicator.

RICHARD E. WAGNER.